United States Patent [19]

Martin et al.

[11] 4,140,765
[45] Feb. 20, 1979

[54] GAS FLOW-SENSOR FOR CHEMICAL OXYGEN GENERATION DEVICE

[75] Inventors: Frank E. Martin, Chester; Edward L. Rich, III, Arnold, both of Md.

[73] Assignee: Westinghouse Electric Corp., Pittsburgh, Pa.

[21] Appl. No.: 805,578

[22] Filed: Jun. 10, 1977

[30] Foreign Application Priority Data

Jul. 17, 1976 [JP] Japan .................................. 51-84503

[51] Int. Cl.² .......................... B01J 7/00; A62B 7/08
[52] U.S. Cl. ................................. 422/119; 128/142 R; 128/191 R; 340/544; 340/611; 422/105; 422/110; 422/120; 422/112; 422/113; 422/166
[58] Field of Search ........................... 23/281; 137/12; 128/142 R, 191 R; 340/240

[56] References Cited
U.S. PATENT DOCUMENTS

| | | | |
|---|---|---|---|
| 3,092,104 | 6/1963 | Cassidy | 128/142 R |
| 3,233,987 | 2/1966 | Hepburn | 48/191 X |
| 3,436,191 | 4/1969 | McGoff et al. | 23/281 |
| 3,737,287 | 6/1973 | Churchill et al. | 23/281 |
| 3,756,785 | 9/1973 | Netteland | 23/281 |
| 3,826,623 | 7/1974 | Delgado | 23/281 |
| 3,957,044 | 5/1976 | Fletcher | 128/203 X |

Primary Examiner—Joseph Scovronek
Attorney, Agent, or Firm—Wenderoth, Lind & Ponack

[57] ABSTRACT

The disclosed gas flow sensor has an orifice connected in an oxygen conduit and a pressure switch connected to the conduit by having a pressure chamber communicating with the conduit. The chamber terminates at a diaphram which is operatively coupled to a normally open microswitch by a spring loaded rod. As the flow rate of oxygen flowing through the conduit drops below a permissible minimum magnitude, back pressure on the orifice decreases so as to close the microswitch to provide a control signal. A bypass valve is connected across the orifice to prevent the oxygen pressure within the conduit from excessively increasing.

2 Claims, 1 Drawing Figure

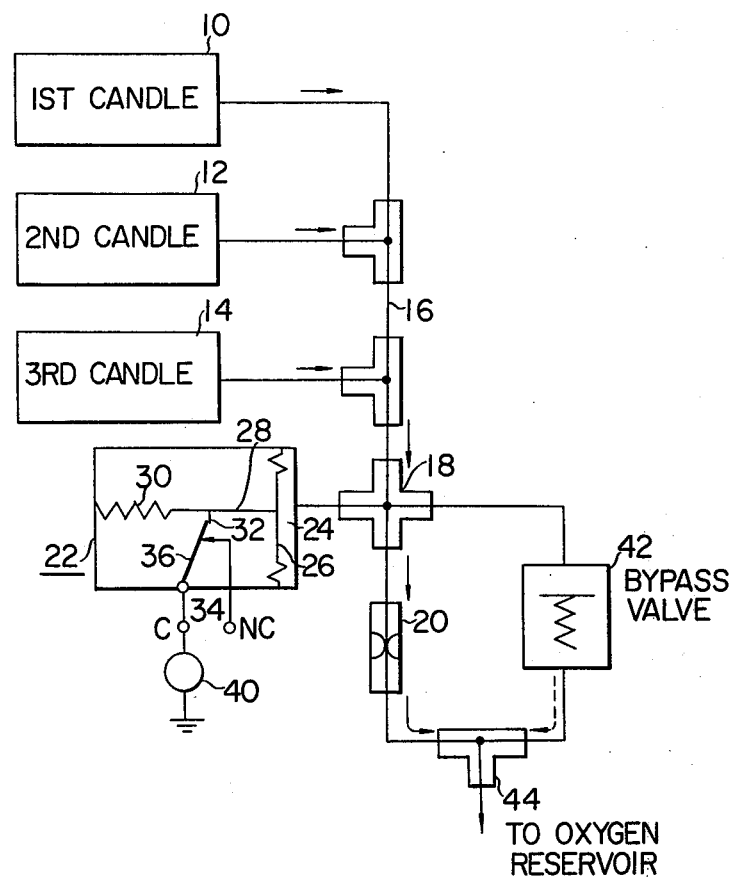

GAS FLOW-SENSOR FOR CHEMICAL OXYGEN GENERATION DEVICE

BACKGROUND OF THE INVENTION

This invention relates to a gas flow sensor used with a chemical oxygen generation device to signal a rate of generation of oxygen less than a predetermined magnitude.

Chemical oxygen generation elements formed principally of a chemical compound capable of generating oxygen by a chemical reaction or pyrolysis are suitable for use in a portable, small-sized oxygen generation device because there is no necessity of employing heavy, pressure-resisting vessels such as are necessary for holding compressed oxygen. One of the most typical examples of such an oxygen generation element is the chlorate system including principally alkali metal chlorate, for example, sodium chlorate having added thereto an exothermic agent such as a powder of reduced iron and a chlorine absorbent such as barium peroxide, the components being shaped into candles by filling canisters with a mixture of the components. Those oxygen generation elements are called "chlorate candles" and when one end thereof is strongly heated by a detonator, an electric heater or the like, the oxygen generation elements generate heat while decomposing and emitting to oxygen. Thereafter the elements touch off chain reactions by means of the decomposition heat generated thereby to continue to emit the oxygen.

There is a problem in the use of oxygen generation devices employing a chemical oxygen generation element as above described in that it is difficult to estimate how much longer the element will continue to generate oxygen after initiation. The ability to generate oxygen remaining after the candle has been burning for a while might be approximated to some extent on the basis of both a nominal rate of generation of oxygen of the particular oxygen generation element and the lapse of time after the initiation of generation of oxygen. However it is difficult always to know the exact time of burning unless a timer is attached to the oxygen generation element. Also, even if this were possible, the rate of generation of oxygen is somewhat variable among different oxygen generation elements. Finally, an oxygen generation element failure before the completion of decomposition is always a possibility, even if remote. Therefore, a means to continuously monitor the status of the oxygen generation (the cessation of the oxygen generation or when that cessation is near at hand) is desirable. This is because the time at which the particular oxygen generation element will stop generating oxygen can not be accurately anticipated.

The monitoring of the generation of oxygen can be based on sensing by the user with simple devices. However, in oxygen generation devices including a plurality of oxygen generation elements to be sequentially decomposed by heat to continuously generate oxygen for artificial respiration devices used in case of emergency, it is unreasonable to expect monitoring of such a device by the user himself or herself. Under these circumstances, it is desirable to provide means for rapidly sensing the cessation of generation of oxygen or the approaching cessation thereof with a high accuracy.

Accordingly it is an object of the present invention to solve the problems as above described.

SUMMARY OF THE INVENTION

The present invention provides a gas flow sensor used with a chemical oxygen generation device comprising at least one chemical oxygen generation element, a feed conduit connected in fluid communication with the at least one oxygen generation element, the chemical oxygen generation element burning to generate oxygen to deliver it to the feed conduit, an orifice connected in the feed conduit downstream of the oxygen generation element, a pressure switch connected to the feed conduit downstream of the oxygen generation element, the orifice producing a back pressure sufficient to open the pressure switch at at least a predetermined minimum magnitude of rate of flow of the oxygen flowing through the feed conduit and to close and maintain the pressure switch in its closed position at a flow rate less than the predetermined minimum magnitude, and a normally closed bypass valve connected across the orifice responsive to a pressure of oxygen within the feed conduit exceeding a predetermined magnitude for being automatically opened.

BRIEF DESCRIPTION OF THE DRAWING

The present invention will become more readily apparent from the following detailed description taken in conjunction with the accompanying drawing in which the single FIGURE is a schematic view of an oxygen generation device having incorporated thereinto a gas flow sensor constructed in accordance with the principles of the present invention.

DESCRIPTION OF THE PREFERRED EMBODIMENT

In a preferred embodiment of the present invention shown in the drawing, a first, a second and a third chlorate candle, 10, 12 and 14, respectively, such as described above, are connected in fluid communication with a common feed conduit 16. The feed conduit 16 is connected via a manifold 18 to an orifice 20. The manifold 18 is connected at one outlet to a pressure switch generally designated by the reference numeral 22.

The pressure switch 22 includes a pressure chamber 24 communicating with the manifold 18 and therefore the feed conduit 16 and separated from the remaining space therein by a diaphragm 26. The diaphragm 26 includes a rod 28 extending from the center of the surface thereof facing the remaining space into the latter and the rod is biased with a spring 30 toward the diaphragm 26. The rod 28 is provided on the intermediate portion with a control protrusion 32 adapted to engage a movable arm 36 of a microswitch 34 including a stationary contact connected to a terminal NC. The movable arm 36 is connected to a terminal C which in turn is connected to an electric source 40 or any suitable signal voltage generator circuit (not shown).

The manifold 18 is also connected at a separate outlet to a bypass valve 42 for a purpose which will be described later. The bypass valve 42 is connected to the orifice 20 through another manifold 44 which is, in turn, connected to an oxygen reservoir (not shown). Thus the bypass valve 42 is connected across the orifice 20.

In the arrangement illustrated the first candle 10 is first ignited by any suitable means (not shown) to emit or generate oxygen and to deliver it to the feed conduit 18 as shown by the solid line. Each of the second and third candles 12 and 14 must be ignited when the preceding one is generating oxygen at a predetermined minimum magnitude of a flow rate, for example 0.3 liter per minute converted in the standard state, that is, at one atmospheric pressure at 25° C.

As well known, the pressure switch 22 has its operating constant determined by the area of the diaphragm 26, the spring force provided by the spring 30 etc. This operating constant of the pressure switch 22 and the dimension of the orifice 20 are preliminarily selected so that the orifice 20 causes a back pressure sufficient to maintain the pressure switch 22 in its open position in response to a flow rate not less than a predetermined minimum magnitude of the oxygen flowing through the feed conduit 16 as shown at solid line and to close and maintain the switch in its closed position shown in response to a flow rate less than the predetermined minimum magnitude due to the particular oxygen generation element not delivering oxygen at or above this rate.

Thus when a flow rate of oxygen flowing through the feed conduit 16 is not less than the predetermined minimum magnitude, the diaphragm 26 along with the rod 28 is moved in the lefthand direction as viewed in the drawing and against the action of the spring 30 to force the movable arm 36 of the microswitch 34 in the same direction resulting in the opening of the microswitch 34. On the contrary, if the flow rate drops below the minimum magnitude as above described then the diaphragm 26 forces the movable arm 36 of the microswitch 34 into engagement with the stationary contact thereof by the action of the spring 30. The closure of the microswitch 34 results in the appearance of a signal voltage at the terminal NC.

In other words, the pressure switch 22 senses a flow rate less than the predetermined minimum magnitude at low pressures of the oxygen within the conduit 16. However, it is to be noted that the pressure switch 22 can accommodate much higher flow rates in excess of say 30 liters per minute in the standard state.

The bypass valve 42 is not directly pertinent to the operation of the pressure switch 22 and it is normally held in its closed position by means of the action of an associated spring. It will readily be understood that the generation of oxygen may at times become quite high as compared with the standard state thereof. For example, each of the candles produces an initial peak surge flow upon its ignition of about five times the normal flow. This results in the danger that components within the system may be excessively pressurized. The bypass valve 42 is immediately responsive to an increase in pressure within the conduit 16 beyond a magnitude sufficient to maintain the pressure switch 22 in its open position to be automatically opened against the action of an associated spring. The opening of the bypass valve 42 permits the flow of oxygen to pass through the now open valve 42 to enter an oxygen reservoir (not shown) normally having a sufficient buffer action as shown by the dotted line while at the same time the pressure within the feed conduit 16 is prevented from excessively increasing. Alternatively the oxygen flow may be externally exhausted. However it is preferable to collect the excess of oxygen passed through the bypass valve 42 into the reservoir so as not to waste oxygen. Accordingly the bypass valve 42 serves as a safety valve, of sorts.

Thus it is seen that, at the normal flow rate, the pressure switch is in its open position while the bypass valve is in its closed position but prevents the system from being excessively pressurized at a permissible maximum flow rate.

As above described, if the flow rate drops below the predetermined minimum magnitude then the back pressure of the orifice decreases to permit the pressure switch or the microswitch 34 to be closed thereby to cause the source 40 to provide a control signal. This control signal may be converted to an audio or an optical signal that can be perceived by the user with the result that the user can rapidly be made aware of the cessation of the oxygen generation or the approaching cessation thereof so as to be able to take the necessary measures for meeting the situation.

Alternatively the control signal from the pressure switch may be utilized to operate any suitable mechanisms for automatically meeting such situation. For example, in the arrangement illustrated, when the first candle 10 nears to the end of the thermal decomposition and the flow rate of oxygen decreases to below the predetermined minimum magnitude a control signal is provided by the pressure switch 22 as above described. This control signal can be supplied to an igniter for the second candle 12 to ignite the latter. Then the process as above described is repeated with the third candle 14.

From the foregoing it is seen that the present invention provides a gas flow sensor having a simple construction used with an oxygen generation device for reliably sensing a change in gas flow at a low pressure with a low flow rate of about 0.3 liter per minute in the standard state indicating the approaching end of the generation of oxygen. Therefore oxygen generation devices utilizing the present gas flow sensor are excellent in both operation and safety because no mental or physical burdens are placed on the user and because it automatically prevents oxygen starvation.

While the present invention has been illustrated and described in conjunction with a single preferred embodiment thereof, it is to be understood that numerous changes and modifications may be resorted to without departing from the spirit and scope of the present invention. For example, the present invention is equally applicable to the generation of gases other than oxygen.

What we claim is:

1. A chemical oxygen generation system comprising at least one chemical oxygen generation element, a feed conduit having one end connected to said at least one oxygen reservoir, said chemical oxygen generation element burning to generate oxygen and delivering it to said feed conduit, a permanently open flow restricting orifice connected to said feed conduit downstream of the oxygen generation element, said orifice having a fixed size for permitting flow therethrough at all times and causing a back pressure in said conduit during flow of oxygen, a pressure switch connected to said feed conduit between said oxygen generation element and said orifice, said orifice having a size for producing a back pressure sufficient to maintain said pressure switch in its open position at a flow which is at least a predetermined minimum magnitude of a flow rate of said oxygen flowing through said feed conduit and to close and maintain said pressure switch in its closed position at a flow rate less than said predetermined minimum magnitude, means to which said switch is connected for producing a signal in response to closing of said switch which is indicative of the reduction of the flow rate below said predetermined minimum magnitude, and a normally closed bypass valve connected across said orifice and responsive to a pressure of oxygen within said feed conduit exceeding a predetermined magnitude for being automatically opened.

2. An oxygen generation system as claimed in claim 1 wherein said pressure switch includes a pressure chamber having a diaphragm constituting one wall thereof and communicating with said feed conduit, and a normally open microswitch operatively associated with said diaphragm, said diaphragm being movable in response to a pressure in said pressure chamber at a flow rate less than the predetermined minimum magnitude of said oxygen flowing through said feed conduit for closing said microswitch.

* * * * *